United States Patent [19]

Lemnios

[11] 3,795,375

[45] Mar. 5, 1974

[54] SYSTEM FOR CONTINUOUSLY TRIMMING HELICOPTER ROTOR BLADES DURING FLIGHT

[75] Inventor: Andrew Z. Lemnios, Longmeadow, Mass.

[73] Assignee: Kaman Aerospace Corporation, Bloomfield, Conn.

[22] Filed: May 22, 1972

[21] Appl. No.: 255,463

[52] U.S. Cl. .............................. 244/17.27, 416/31
[51] Int. Cl. .......................................... B64c 27/72
[58] Field of Search ................ 416/31, 500, 23, 24; 244/17.13, 17.11, 77 R, 77 D, 77 G, 77 F, 17.27, 17.25; 318/584; 73/147

[56] References Cited
UNITED STATES PATENTS

| 2,625,997 | 1/1953 | Doak | 416/23 |
| 3,482,805 | 12/1969 | Knemeyer | 244/77 D |
| 3,658,280 | 4/1972 | McDonnell | 244/72 D |
| 2,921,289 | 1/1960 | Eklund et al. | 244/17.11 X |
| 2,960,168 | 11/1960 | Emmerson et al. | 244/17.13 |
| 2,892,502 | 6/1959 | Donovan | 416/500 X |

Primary Examiner—Duane A. Reger
Assistant Examiner—Paul E. Sauberer
Attorney, Agent, or Firm—McCormick, Paulding & Huber

[57] ABSTRACT

A vibration sensor is mounted on the air frame to provide a continuous output proportional to the unbalance of the rotor blades with respect to one another. This output is fed to a trim tab on the particular blade causing the unbalance to alter that blade's lift slightly until the balance is reduced to an acceptable level.

2 Claims, 3 Drawing Figures

PATENTED MAR 5 1974 3,795,375

ELECTRIC CIRCUITRY FOR PROVIDING PULSED OUTPUT TO ACTUATORS A, B, C or D

BLADE REFERENCE INPUT

SYSTEM FOR CONTINUOUSLY TRIMMING HELICOPTER ROTOR BLADES DURING FLIGHT

BACKGROUND OF INVENTION

This invention relates to the trimming of helicopter rotor blades, and deals more particularly with a system for automatically sensing once per revolution unbalance of the rotor during rotation, and for continuously varying the trim of the unbalanced blade during flight to reduce the cyclic stick shake of a helicopter.

Heretofore, each blade has been provided with a manually movable trim tab which must be set on the ground (with the rotor stationary). The rotor is generally subjected to a series of whirl tests during which the tracking characteristics of each blade are recorded so that a skilled mechanic can make minute changes to the fixed tab on each blade until the rotor is satisfactorily balanced.

U.S. Pat. No. 2,630,709 issued to Hoffman et al. shows one such approach to the problem of eliminating the objectionable one per revolution stick shake characteristic of an unbalanced rotor. In the Hoffman patent the complex blade tracking recorders have been replaced by a stylus which makes a trace on a moving chart in response to the dynamic pitching moment of each blade as it passes a given point during rotation of the rotor. However, the fixed tabs on each blade must still be manually bent on the ground to trim the rotor so that its blades track properly.

One example of an in flight system for trimming helicopter rotor blades is shown and described in U.S. Pat. No. 2,960,168, issued to Emmerson et al. in 1960. The servo flap rotor system of the Emmerson patent includes twistable rotor blades which blades are operated by a primary flight control system of the servo flap type. The basic flight control system is a conventional one and includes a control linkage such as that shown in U.S. Pat. No. 2,695,674 issued to Kaman et al. except for at least one link associated with each blade, which link is of variable dimension. This variable length link is in the form of an actuator which can be selectively operated in flight to vary the instantaneous configuration of the servo flap of one blade relative to that of another blade. The present invention provides a rotor blade trimming system which is independent of the primary flight control system.

The principle object of the present invention is to provide a system for continuously trimming the rotor blades to eliminate the once per revolution stick shake caused by an unbalanced helicopter rotor.

SUMMARY OF INVENTION

Each blade is equipped with a trim tab which can be moved in flight by a small actuator in the blade itself. This actuator preferably has a slow time response in relation to the normal cyclic pitch changes introduced by the helicopter's cyclic pitch control mechanism, and said actuator operates in response to the output of a feedback control circuit which includes vibration sensor mounted to the air frame for sensing one per revolution pitching moment changes caused by one or more unbalanced blades in the rotor. The actuator and the sensor can be selectively operated in flight to provide continuous trimming of the rotor blades.

DETAILED DESCRIPTION

Figure 1:
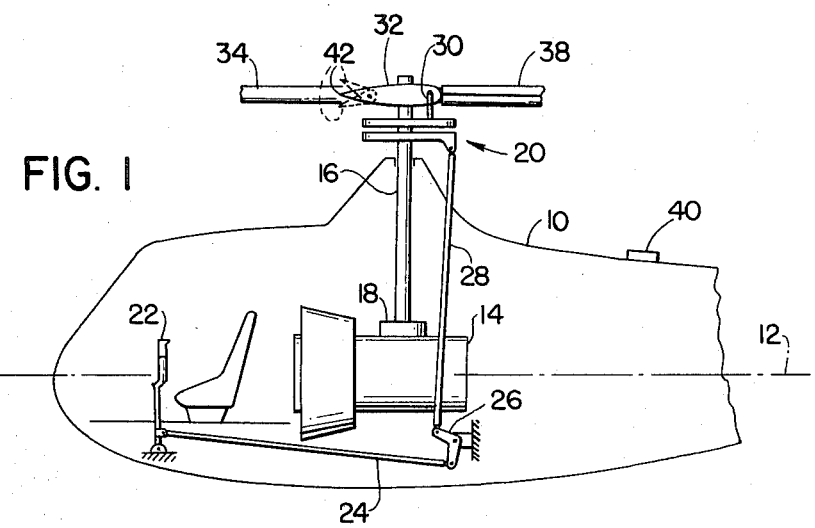
FIG. 1 is an overall view of a helicopter equipped with a rotor having blades in which actuators are provided to operate trim tabs in response to the output of a vibration transducer.

Turning now to the drawing in greater detail, in FIG. 1 shows a portion of a helicopter having an air frame 10 with a longitudinal axis 12 and an engine 14 for turning a rotor drive shaft 16 through a gear reduction 18. A conventional swash plate assembly 20 is provided on the rotor drive shaft 16 and a four bladed rotary wing structure is adapted to be driven by the drive shaft in a conventional fashion. The individual blades can be varied in their angle of pitch one with respect to another by a conventional cyclic pitch control mechanism, in response to movement of a cyclic pitch control lever 22. The lever 22 is connected, by a system of push rods 24, 26 and 28, to a non-rotating portion of the swash plate assembly, and a rotating portion of the swash plate assembly is adapted to vary the pitch of the blades cyclically to control fore and aft, as well as left and right hand movement, of the helicopter in flight in a conventional manner. As mentioned, four blades 32, 34, 36 and 38 are provided in the rotary wing structure of this particular helicopter, but it should be understood that the advantages to the present invention can be realized as long as two or more blades are provided in such a rotary wing structure.

When the rotor blades 32, 34, 36 and 38 are turned by the engine 14 through the rotor drive shaft 16, or due to aerodynamic action in the autorotation state of the helicopter, the cyclic pitch control mechanism 22, 24, 26, 28 and 20 will be subjected to cyclical vibrations if the pitch of one rotor blade differs from that of any other absent control inputs by the pilot to the lever 22 and absent spurious aerodynamic moments in flight. The present invention provides a convenient mechanism for automatically compensating for once per revolution shake in the cyclic pitch control lever 22 caused by unbalance of one or more of the rotor blades with respect to the others.

In accordance with the present invention a vibration transducer, or sensor, in the form of an electromechanical vertical accelerometer 40 is provided in the air frame in spaced relation to the drive shaft 16. This transducer is preferably provided either forward or aft of the rotor drive shaft 16 on the longitudinal axis 12 of the helicopter, and as shown the transducer 40 is located aft of the rotor drive shaft 16 and at a substantial horizontal displacement with respect thereto. The precise location in some aircraft may be dictated by vibration characteristics of the craft. This vertical accelerometer is adapted to provide an electrical output in response to variations in the pitching moments of the respective blades as they pass the position of blade 38 in FIG. 1, or more particularly as they pass the zero degree position, the 180° position being represented by the forwardly directed blade 34 in FIG. 1. A conventional helicopter rotor rotates in a counterclockwise direction, as viewed from above, and as so viewed the zero degree position would then be directed rearwardly or opposite the direction of forward flight. The 270° position would be the position of the blade 32 in FIG. 1, the 180° position, the position of blade 34 in FIG. 1 and finally the remaining blade (not shown) would occupy the 90° position in FIG. 1.

Figure 3:
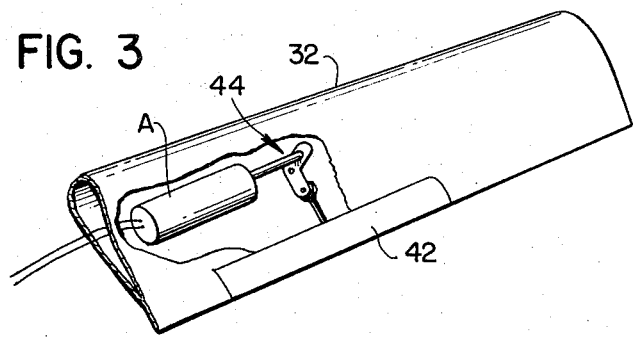
FIG. 3 is a schematic view of one rotor blade showing one of the electrically driven actuators in FIG. 2, and its driving connection to a trim tab on the rotor blade.

In further accordance with the present invention an electric actuator motor such as shown at A in FIG. 3 is provided in at least one of the blades 32, and is adapted to operate a trim tab 42 located in the trailing edge of that particular rotor blade. A conventional linkage, as indicated generally at 44, is provided between the end of the accumulator and the trim tab itself so as to deflect the trim tab 42 between the broken line positions shown in FIG. 1. The streamline position is indicated by solid lines in that view, and the limit positions, up and down, are shown in broken lines.

Figure 2:
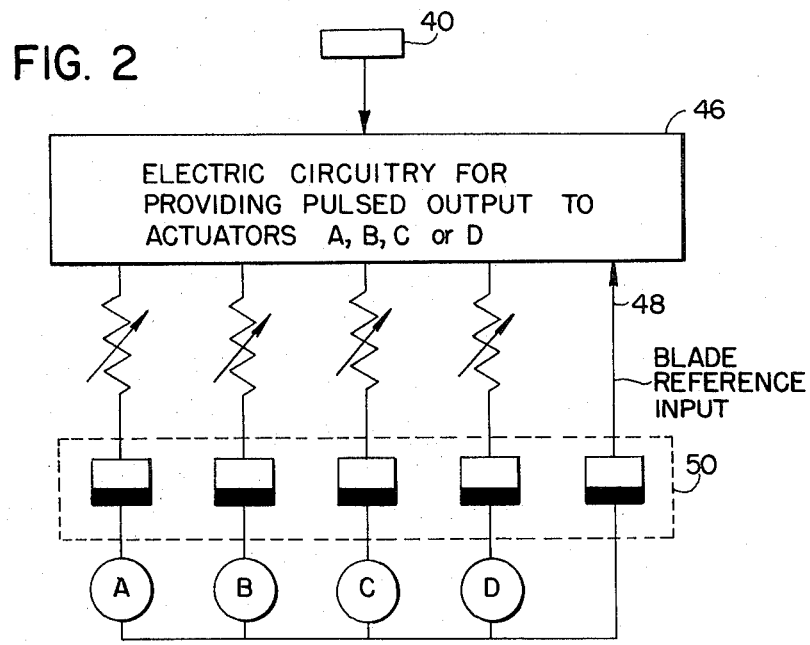
FIG. 2 is a schematic view showing the essential elements of the control circuitry for operating the apparatus of FIG. 1 including a four bladed rotor.

As indicated schematically in FIG. 2 the electric circuitry, indicated generally at 46, is adapted to receive inputs from the electromechanical transducer 40, and also a blade reference position input signal 8. Slip ring and brush contact means 50 are provided for each of the actuators A, B, C, D and for the blade reference position input signal 48 so as to provide a convenient input means for the circuitry 46. This electric circuit means 46 consists of conventional components, and is adapted to provide selective outputs to one or more of the actuators A, B, C or D in response to the inputs from the accelerometer 40 and the blade reference position signal 48. More particularly this circuitry 46 is capable of providing a pulsed output to one of the actuator motors in one of the rotor blades at a proper point in time for reducing rotor unbalance. An on/off switch may also be provided as a portion of this circuitry, and located in the cockpit so as to permit the pilot of the helicopter to selectively engage or disengage the above described system for selectively trimming the helicopter rotor in flight and thereby eliminate unbalance due to one per revolution stick shake of the type caused by cyclical vibrations in the pitch of the rotor blades. A feature of the present invention is that the pilot will not have to release the cyclic control lever 22 when engaging the present system in order to eliminate any cyclic control input to the transducer 40.

In operation, the pilot either while in straight and level flight, or in any coordinated maneuver, closes the switch provided for this purpose in the cockpit, thereby energizing the circuitry 46, as well as the transducer 40, and when an out of balance rotor blade passes the zero degree position, transducer 40 generates a signal to the circuitry 46 at the proper point in time as a result of the input in line 48, and a pulse output is provided to that particular actuator A, B, C or D so as to cause a limited angular deflection of the trim tab 42 in the proper direction tending to reduce the amount of unbalance. If the pulsed output does not produce sufficient angle of deflection of the trim tab 42 to eliminate the unbalance then, upon the next complete revolution of the rotor the blade will experience still another stepped output from the circuitry 46 increasing the correction as required. In this manner, the helicopter rotor blade can be continually trimmed in flight, without the necessity for experienced ground mechanics and complicated electronic equipment being required to trim the craft on the ground as has been the case heretofore.

I claim:

1. In combination with a rotary wing aircraft which includes an airframe having a longitudinal axis and a plurality of rotor blades which blades are capable of control in flight by a control lever through a primary flight blade control mechanism: a vibration transducer mounted to the airframe and located on said airframe axis for sensing once per revolution pitching moment transients and generating an output in response thereto, a trim tab on at least one of said rotor blades, an actuator mechanically connected to said blade mounted trim tab for altering the lift contribution of that blade independently of said primary flight control mechanism, and means for energizing said actuator in response to the output of said transducer.

2. The combination of claim 1 wherein said means for energizing said actuator comprises an electric circuit which includes slip ring and brush means between said airframe and said rotor blades for selectively energizing said trim tab actuator motor when said blade is in a particular position with respect to the longitudinal axis of the airframe and hence to the location of said transducer.

* * * * *

UNITED STATES PATENT OFFICE
CERTIFICATE OF CORRECTION

Patent No. 3,795,375             Dated March 5, 1974

Inventor(s) Andrew Z. Lemnios

It is certified that error appears in the above-identified patent and that said Letters Patent are hereby corrected as shown below:

Col. 1, line 21, after "et al" the period (.) should be omitted.

Col. 1, line 41, after "et al" the period (.) should be a comma (,).

Col. 2, line 16, "detail, in Fig." should be --detail, Fig.--.

Col. 3, line 16, "accumulator" should be --actuator--.

Col. 3, line 24, "8" should be --48--.

Signed and sealed this 17th day of December 1974.

(SEAL)
Attest:

McCOY M. GIBSON JR.       C. MARSHALL DANN
Attesting Officer         Commissioner of Patents